United States Patent [19]
Hwang

[11] Patent Number: 6,109,110
[45] Date of Patent: Aug. 29, 2000

[54] LOW FREQUENCY VIBRATION SENSOR

[76] Inventor: Shih Ming Hwang, 17811 Sky Park Cir., Suite D&E, Irvine, Calif. 92714

[21] Appl. No.: 09/093,231

[22] Filed: Jun. 8, 1998

[51] Int. Cl.$^7$ .................................................. G01H 11/08
[52] U.S. Cl. ............................................ 73/654; 340/566
[58] Field of Search ........................ 73/652, 654, 514.34; 310/329; 340/566, 683, 689

[56] References Cited

U.S. PATENT DOCUMENTS

| | | | |
|---|---|---|---|
| 4,086,807 | 5/1978 | Nakada | 73/652 |
| 4,656,458 | 4/1987 | Iwata | 73/652 |
| 4,723,447 | 2/1988 | Laing | 73/654 |

Primary Examiner—John E. Chapman
Attorney, Agent, or Firm—Raymond Y. Chan; David and Raymond

[57] ABSTRACT

A low frequency vibration sensor includes a permanent magnet, a sensor body, a steel spheroid, and a piezoelectric element. The sensor body has a pillar shape and is made of plastic material having a transverse separator section in a middle portion to divide the sensor body in an upper and a lower spaces. A depressed slot is formed around the upper space for disposing the magnet, while the lower space is made larger than the steel spheroid so as to accommodate it therein movably and also put under the influence of an attractive force of the magnet above. A piezoelectric element is set in along a grooved rail provided around the bottom edge of the sensor body to thereby form a closed space. The steel spheroid is movable to swing in the space such that its motion is conducted to the piezoelectric element to induce a corresponding low frequency electric signal between two electrodes of the piezoelectric element to thereby detect the vibration caused by an external force.

8 Claims, 7 Drawing Sheets

LOW FREQUENCY VIBRATION SENSOR

BACKGROUND OF THE PRESENT INVENTION

At present, sensors are popularly utilized in the industrial application fields, and moreover, for burglary, catastrophe protections, and vehicle intrusion sensing. In order to upgrade its sensitivity, an important factor is sometime neglected during designing a vibration sensor that should be operated sensibly and accurately as well. A conventional sensor is often so sensitive in response to a great noise produced by thunders or firecrackers and has a nuisance operation that may cause a lot of troubles.

In order to rectify the above mentioned shortcoming and to improve the properties of the conventional vibration sensor in the present market, the inventor of the present invention has developed a new low frequency vibration sensor through long time efforts, that is disclosed hereinafter.

SUMMARY OF THE PRESENT INVENTION

It is an object of the present invention to provide a low frequency vibration sensor, which can make its steel spheroid to maintain standstill in a magnetic field produced by a permanent magnet. While an external force affects it, it will swing up and down, and from right to the left, to thereby conduct its motion through the sensor body to a piezoelectric element, so as to induce an electric signal between two electrodes of the piezoelectric element.

It is another object of the present invention to provide a low frequency vibration sensor which can minimize its nuisance operation by connecting, in series, a high frequency filter circuit outside of the sensor body to filter out any high frequency signals accompanied with the electric signal produced by the piezoelectric element.

In order to achieve the above and other objects, the low frequency vibration sensor of the present invention comprises: a permanent magnet, a sensor body, a steel spheroid a piezoelectric element. The sensor body is further divided in an upper and a lower spaced apart by a separator installed in a middle portion thereof. The upper space has a depressed slot for setting the permanent magnet, while the steel spheroid is accommodated in the lower space movably within the influence of attraction of the permanent magnet set in the upper space. The piezoelectric element is set in a grooved rail formed around a bottom edge of the sensor body. As an external force influences the steel spheroid, its swinging in the sensor body is conducted to the piezoelectric element through the sensor body so as to induce an electric signal between the electrodes of the piezoelectric element. Furthermore, a high frequency filter circuit is connected in series with the sensor to thereby filter out any high frequency signals, which may cause a nuisance operation of the sensor.

BRIEF DESCRIPTION OF THE DRAWINGS

The following drawings disclose an illustrative embodiment of the present invention, which serves to exemplify the various, advantages and objects hereof.

Numeral representation of each part in the above drawings:

| | |
|---|---|
| 10: permanent magnet | 11: steel spheroid |
| 12: sensor body | 13: separator section |
| 14: grooved rail | 15: piezoelectric element |
| 151: first electrode | 152: second electrode |
| 153: output terminal | 16: outer edge of magnet 10 |
| 17: depressed slot | 18: serrated rail |
| 19: gap | 20: separator |
| 21: grooved rail | 22: side surface |
| 23: elliptical body | 24: sensor body |
| 25: permanent magnet | 26: piezoelectric element |
| 27: steel spheroid | 28: steel spheroid |
| 29: piezoelectric element | 30: permanent magnent |

DETAILED DESCRIPTION OF THE PREFERRED EMBODIMENT

Figure 1:
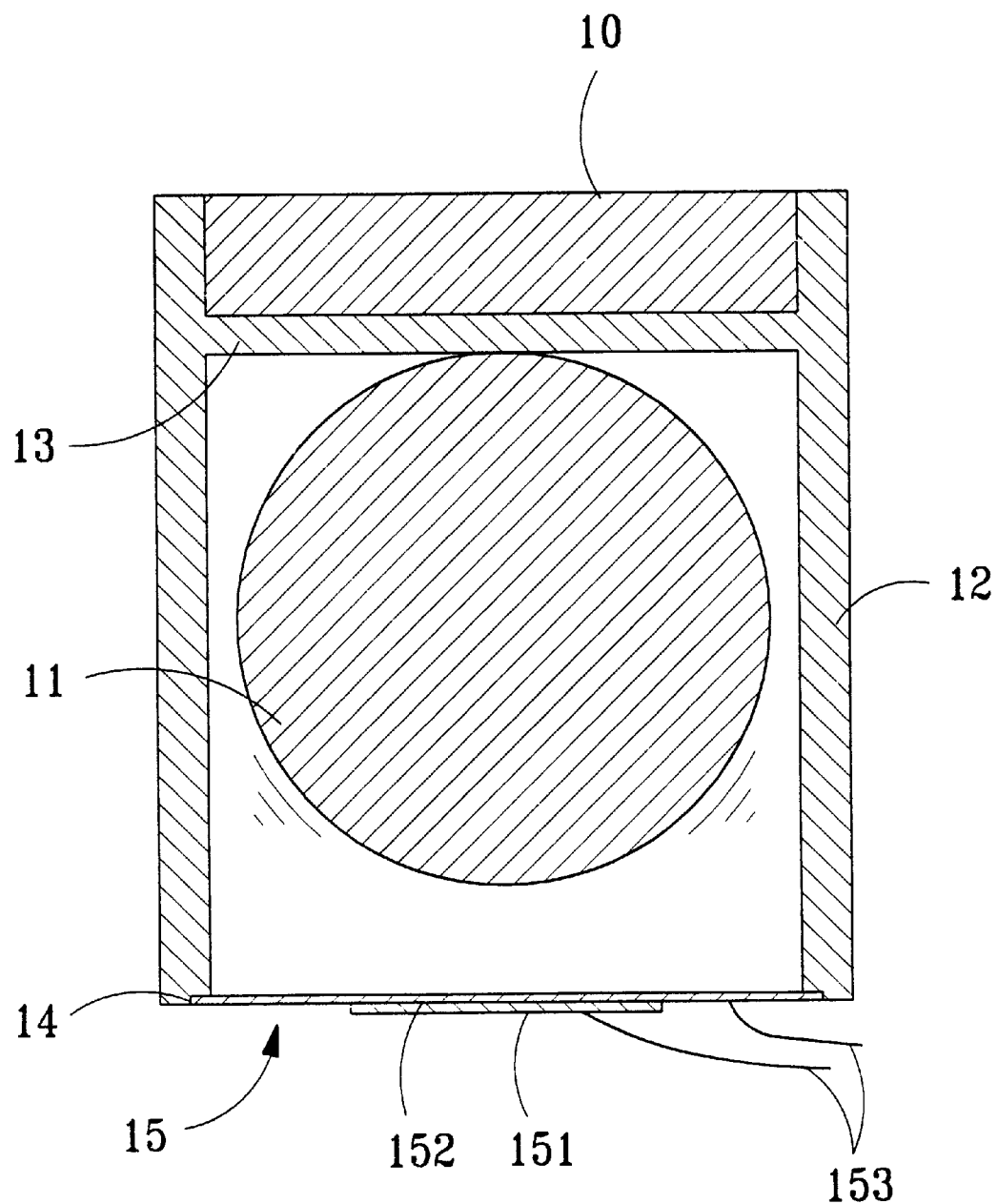
FIG. 1 is a cross sectional view of a low frequency vibration sensor according to a first preferred embodiment of the present invention.

Referring to FIG. 1, a cross sectional view of a low frequency vibration sensor of the present invention is illustrated. The sensor comprises a permanent magnet 10 adopted to attract a steel spheroid 11 with its magnetic force; a pillar shaped sensor body 12, made of a plastic material, having a transverse separator section 13 formed near an upper opening thereof for providing an upper space to set in the permanent magnet 10, wherein a bottom edge of the sensor body 12; and a piezoelectric element 15 having a first and a second electrode 151, 152 and a pair of output terminals 153. The steel spheroid 11 is adapted for detecting an external force.

Figure 2:
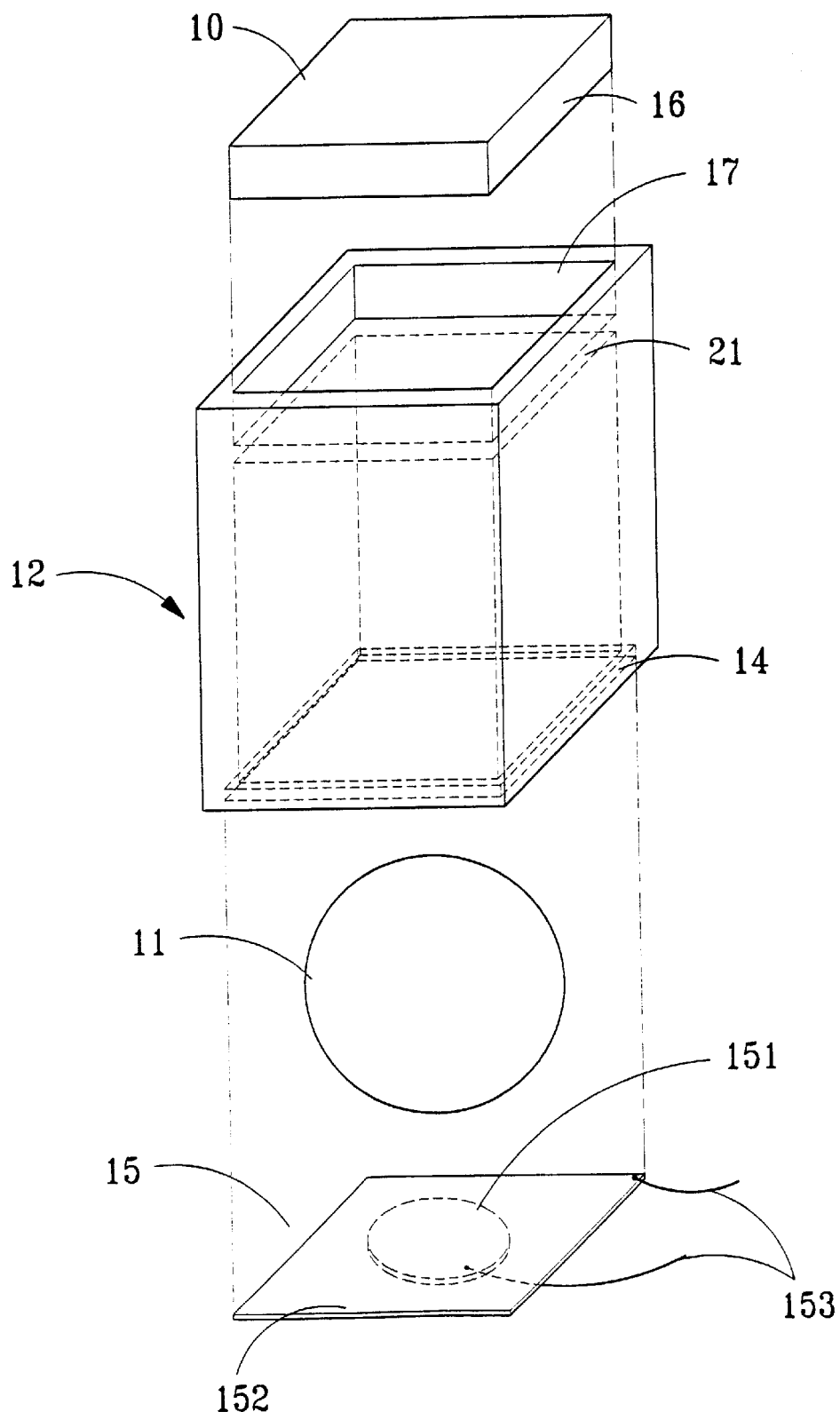
FIG. 2 is a three dimensional exploded view of the low frequency vibration sensor according to the above first preferred embodiment of the present invention.

Referring to FIG. 2, an outer edge of the permanent magnet 10 is adapted closely with an inner edge of the depressed slot 17. The steel spheroid 11 is accommodated in a lower space of the pillar shaped sensor body 12, in which the volume of the lower space is larger than that of the steel spheroid 11, so that the steel spheroid 11 may swing freely therein and be hung in a center portion when it is attracted by the magnetic force of the permanent magnet 10. The piezoelectric element 15 is set in a grooved rail 14 formed around a bottom edge of the sensor body 12. When an external force exerted on the steel spheroid 1 is larger than the attractive magnetic force of the magnet 10, a static state of the steel spheroid 11 in the sensor body is agitated, so the steel spheroid 11 begins to swing. The motion of the steel spheroid 11 is conducted to the piezoelectric element 15 so as to produce an electric signal between the electrodes 151 and 152. The electric signal is outputted from the output terminals 153. Thereby, an external vibration effect is detected.

Figure 3:
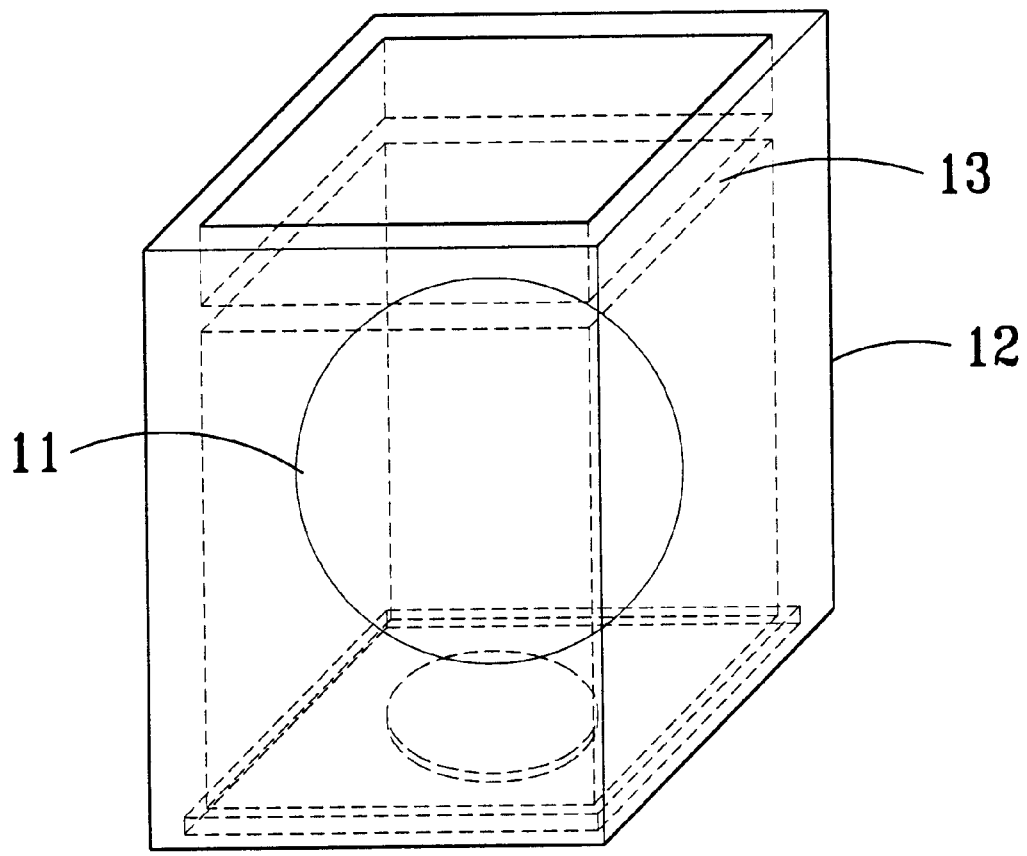
FIG. 3 is a three dimensional view of the low frequency vibration sensor according to the above first preferred embodiment of the present invention.

Referring to FIG. 3, the steel spheroid 11 is hung up and in point contacts with the separator section 13 in the sensor body 12.

Figure 4:
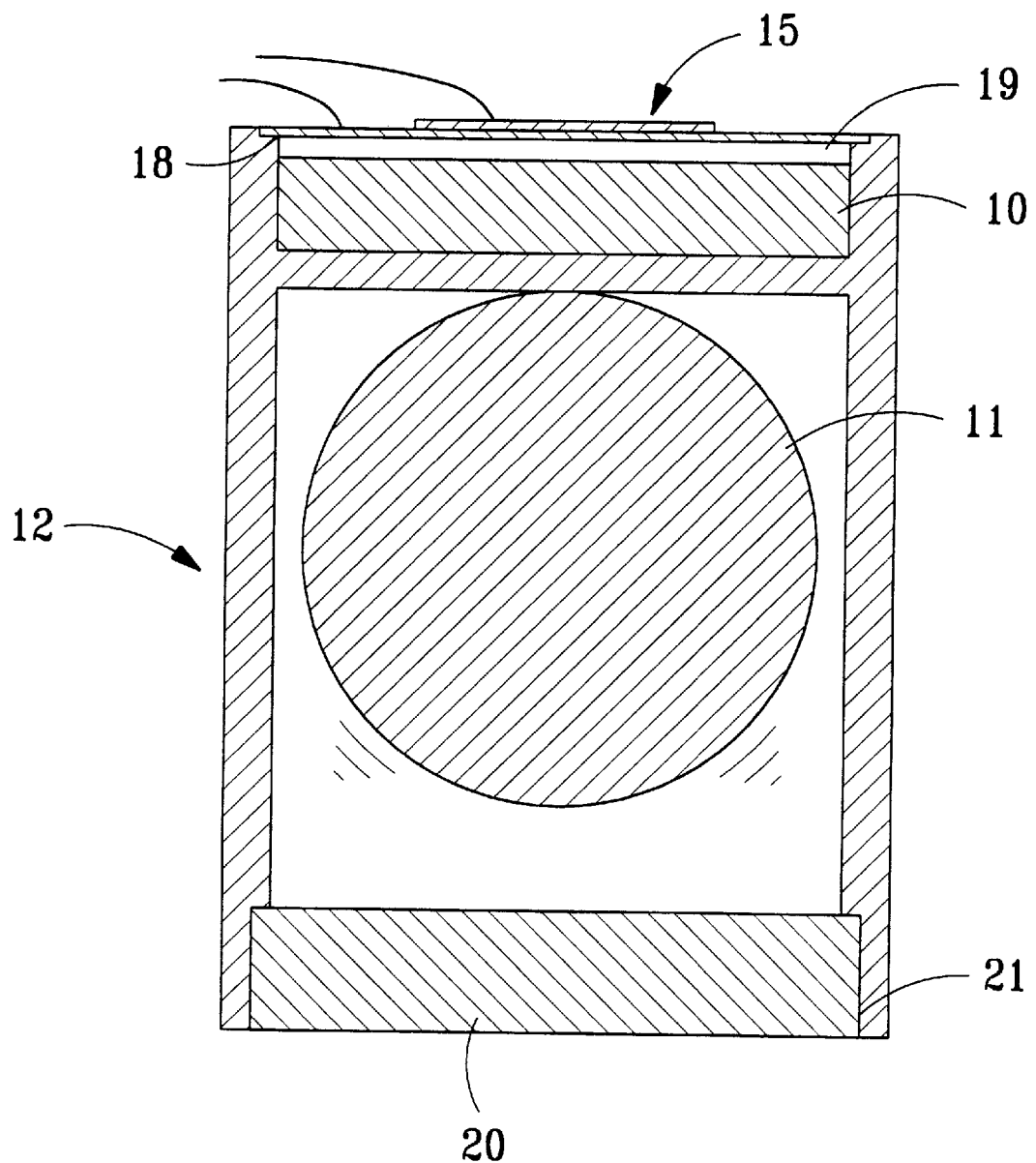
FIG. 4 is a sectional view of a low frequency vibration sensor according to a second preferred embodiment of the present invention.

Referring to FIG. 4, a low frequency vibration sensor according to a second embodiment of the present invention is illustrated, wherein the piezoelectric element 15 is installed over the permanent magnet 10 with a gap 19 there between by forming a serrated rail 18 along the inner edge of the depressed slot 17 to thereby dispose the magnet 10 and the piezoelectric element 15 respectively for enhancing the vibration sensor sensitivity of the piezoelectric element.

A separator 20 is set in a grooved rail 21 at the bottom of the sensor body 12 so as to enclosed the steel spheroid 11 in the sensor body 12.

Figure 5:
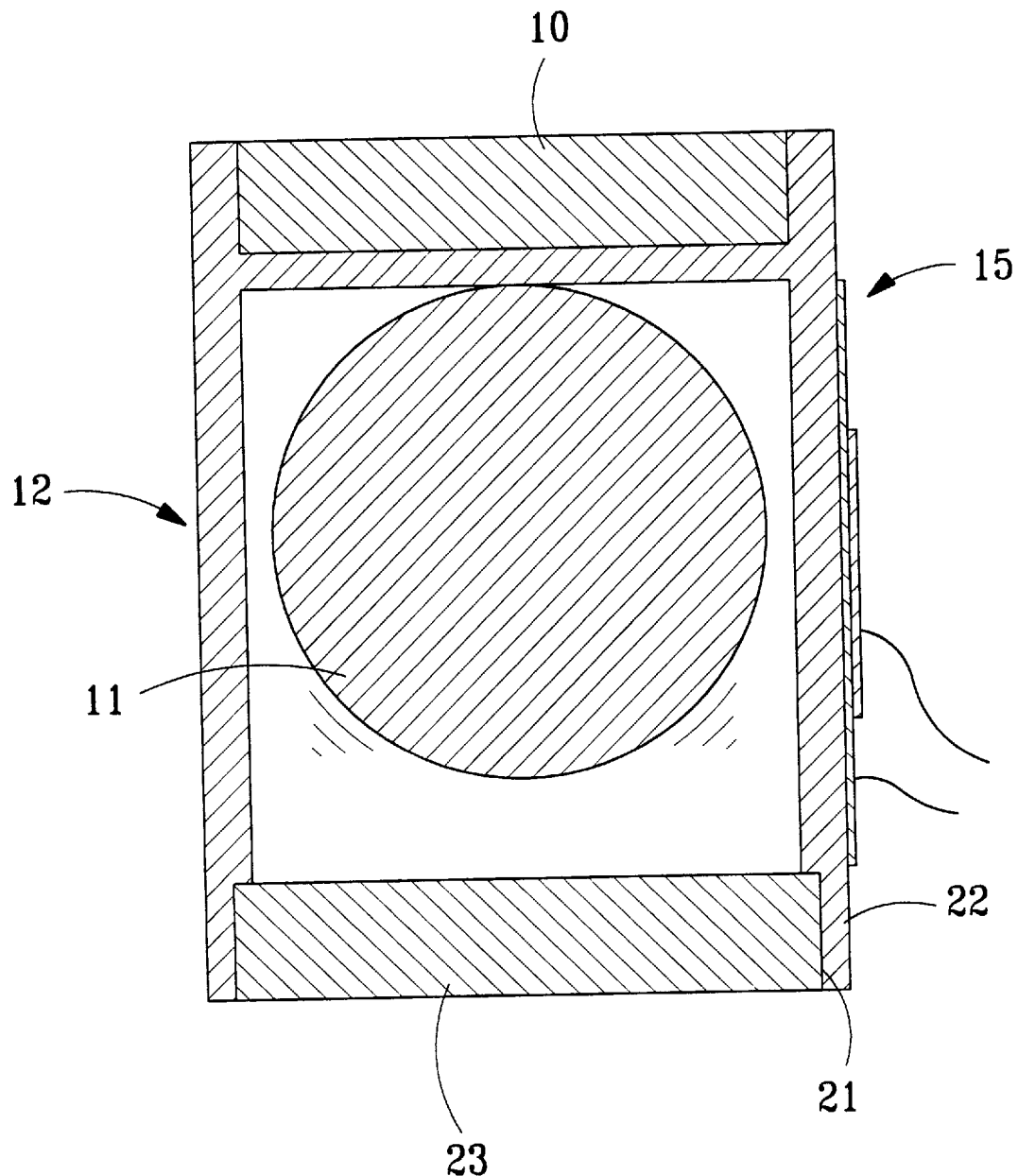
FIG. 5 is a sectional view of a low frequency vibration sensor according to a third referred embodiment of the present invention.

Referring to FIG. 5, a low frequency vibration sensor according to a third embodiment of the present invention is illustrated, wherein the piezoelectric element 15 is installed on an outer side surface 22 of the sensor body 12. The permanent magnet 10 is set in the depressed slot 17. A separator 20 is set in a grooved rail 21 at the bottom of the sensor body 12 to thereby enclose the steel spheroid 11 in the sensor body 12.

Figure 6:
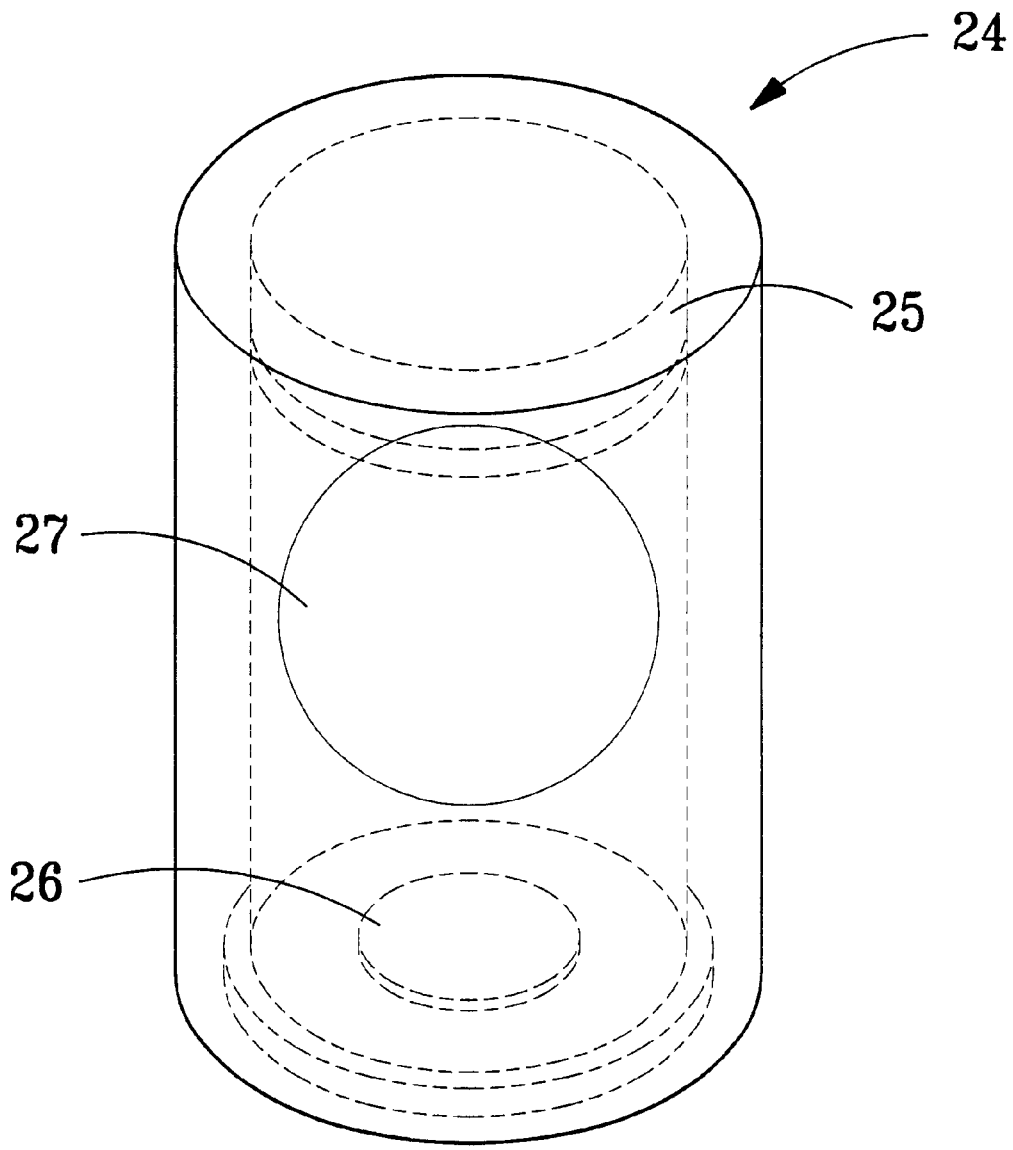
FIG. 6 is a perspective view of a low frequency vibration sensor according to a fourth preferred embodiment of the present invention.

Referring to FIG. 6, a low frequency vibration sensor according to a fourth embodiment of the present invention is illustrated, wherein the sensor body 24 is formed into a cylindrical figure and both a permanent magnet 25 and a piezoelectric element 25 are also formed into cylindrical figure accordingly. The lower space of the sensor body 12 is larger than the steel spheroid 27 to thereby enable the steel spheroid 27 to move freely therein.

Figure 7:
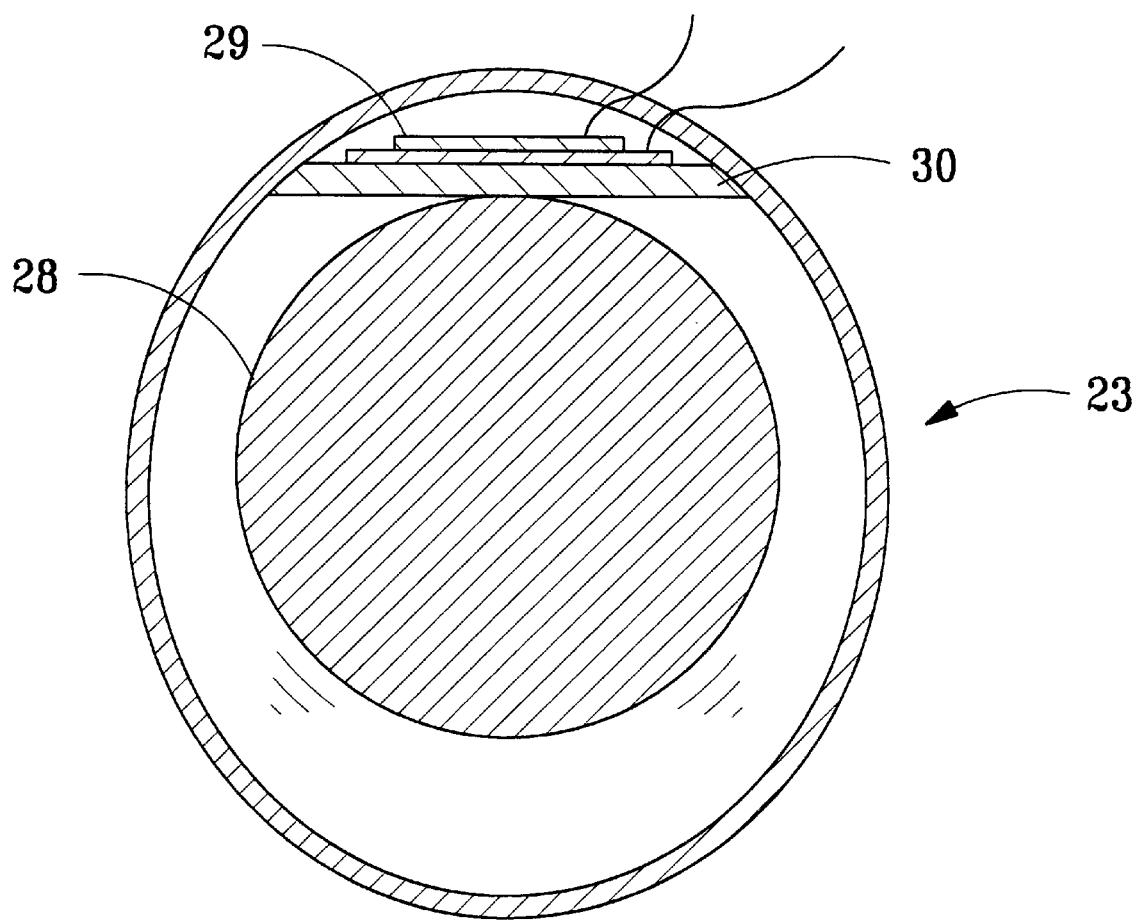
FIG. 7 is a sectional plan view of a low frequency vibration sensor according to a fifth preferred embodiment of the present invention.

Referring to FIG. 7, a low frequency vibration sensor according to a fifth embodiment of the present invention is illustrated, wherein the sensor body 23 is formed into elliptical figure, and a permanent magnet 30 is disposed in an upper portion of the sensor body 23 so as to attract a steel spheroid 28 to standstill normally. A piezoelectric element 29 is interposed in the space between the permanent magnet 29 and the sensor body 23 while the function of the low frequency vibration sensor is not affected by its appearance.

Furthermore, a high frequency filter circuit may be connected in series with the low frequency vibration sensor to thereby filter out any high frequency signals, which may cause a nuisance operation of the low frequency vibration sensor.

The low frequency vibration sensor provided according to the present invention is characterized in that a semi-permanent piezoelectric element is utilized as a sensing element which has an excellent durability and is capable of maintaining its sensitivity and efficiency unchanged in any varying environmental conditions.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A low frequency vibration sensor, comprising a permanent magnet, a sensor body, a steel spheroid, and a piezoelectric element, wherein said sensor body has a pillar shape made of a plastic material having a transverse separator section in a middle portion to divide said sensor body in an upper space and a lower space, and a depressed slot is formed around said upper space for disposing said permanent magnet while said lower space is made larger than said steel spheroid, so as to accommodate said steel spheroid therein movably and also put said steel spheroid under the influence of an attractive force of said permanent magnet above, wherein said piezoelectric element is set in along a grooved rail provided on said sensor body to thereby form a closed space.

2. The low frequency vibration sensor as claimed in claim 1 wherein said steel spheroid is movable to swing in said space of the sensor body such that a motion thereof is conducted to said piezoelectric element to educe a corresponding low frequency electric signal between two electrodes of said piezoeiectric element to thereby detect the vibration caused by an external force.

3. The low frequency vibration sensor as claimed in claim 1 wherein said sensor body has a polygonal cross section.

4. The low frequency vibration sensor as claimed in claim 2 wherein said sensor body has a polygonal cross section.

5. The low frequency vibration sensor as claimed in claim 1 wherein said piezoelectric element is disposed along a grooved rail provided around a bottom edge of said sensor body.

6. The low frequency vibration sensor as cloned in claim 2 wherein said piezoelectric element is disposed along a grooved rail provided around a bottom edge of said sensor body.

7. The low frequency vibration sensor as claimed in claim 3 wherein said piezoelectric element is disposed along a grooved rail provided around a bottom edge of said sensor body.

8. The low frequency vibration sensor as claimed in claim 4 wherein said piezoelectric element is disposed along a grooved rail provided around a bottom edge of said sensor body.

* * * * *